United States Patent
Nakahara et al.

(10) Patent No.: US 8,179,750 B2
(45) Date of Patent: May 15, 2012

(54) OPTICAL PICKUP DEVICE AND OPTICAL DISC DEVICE

(75) Inventors: Hironori Nakahara, Tokyo (JP); Toshiya Matozaki, Tokyo (JP); Nobuo Takeshita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/034,735

(22) Filed: Feb. 25, 2011

(65) Prior Publication Data

US 2011/0211429 A1  Sep. 1, 2011

(30) Foreign Application Priority Data

Feb. 26, 2010  (JP) .................................. 2010-42015

(51) Int. Cl.
*G11B 7/00* (2006.01)
(52) U.S. Cl. ............ 369/44.23; 369/112.01; 369/112.21
(58) Field of Classification Search ............. 369/112.01, 369/44.37, 44.23, 112.1, 112.02, 112.03, 369/112.16, 112.17, 112.24, 112.21, 112.28, 369/119, 44.24
See application file for complete search history.

(56) References Cited

U.S. PATENT DOCUMENTS

| | | | |
|---|---|---|---|
| 7,616,550 B2 * | 11/2009 | Kan | 369/112.17 |
| 7,813,234 B2 * | 10/2010 | Kamioka | 369/44.32 |
| 2006/0077809 A1 * | 4/2006 | Makita et al. | 369/44.37 |
| 2008/0095014 A1 * | 4/2008 | Mori et al. | 369/112.01 |
| 2008/0267042 A1 * | 10/2008 | Kano et al. | 369/112.16 |
| 2008/0279060 A1 * | 11/2008 | Nishi et al. | 369/44.37 |
| 2009/0022037 A1 * | 1/2009 | Hotta et al. | 369/112.16 |
| 2009/0122685 A1 * | 5/2009 | Torii | 369/112.01 |
| 2009/0201789 A1 * | 8/2009 | Nakata et al. | 369/112.24 |
| 2010/0103803 A1 * | 4/2010 | Yamasaki et al. | 369/112.24 |
| 2010/0214891 A1 * | 8/2010 | Anzai et al. | 369/47.36 |

FOREIGN PATENT DOCUMENTS

| | | |
|---|---|---|
| JP | 59-58414 A | 4/1984 |
| JP | 8-55357 A | 2/1996 |
| JP | 8-147747 A | 6/1996 |
| JP | 2001-6205 A | 1/2001 |
| JP | 2009-64493 A | 3/2009 |

* cited by examiner

*Primary Examiner* — Nabil Hindi
(74) *Attorney, Agent, or Firm* — Birch, Stewart, Kolasch & Birch, LLP

(57) ABSTRACT

An optical pickup device includes a plurality of laser light sources emitting laser beams of different oscillation wavelengths, and a plurality of objective lenses on which the laser beams in the form of diverging beams emitted by the plurality of laser light sources are incident, and which directly focus the laser beams onto a recording surface of an optical disc. A rising mirror reflects a laser beam in the form of a diverging beam emitted by a laser light source of a predetermined oscillation wavelength among the plurality of laser light sources so as to lead the laser beam to one of the plurality of objective lenses, and transmits the laser beam in the form of a diverging beam emitted by the other laser light source. As the rising mirror transmits the laser beam in the form of the diverging beam emitted by said other laser light source, astigmatism is generated so as to correct existing astigmatism of the laser beam emitted by said other laser light source.

10 Claims, 9 Drawing Sheets

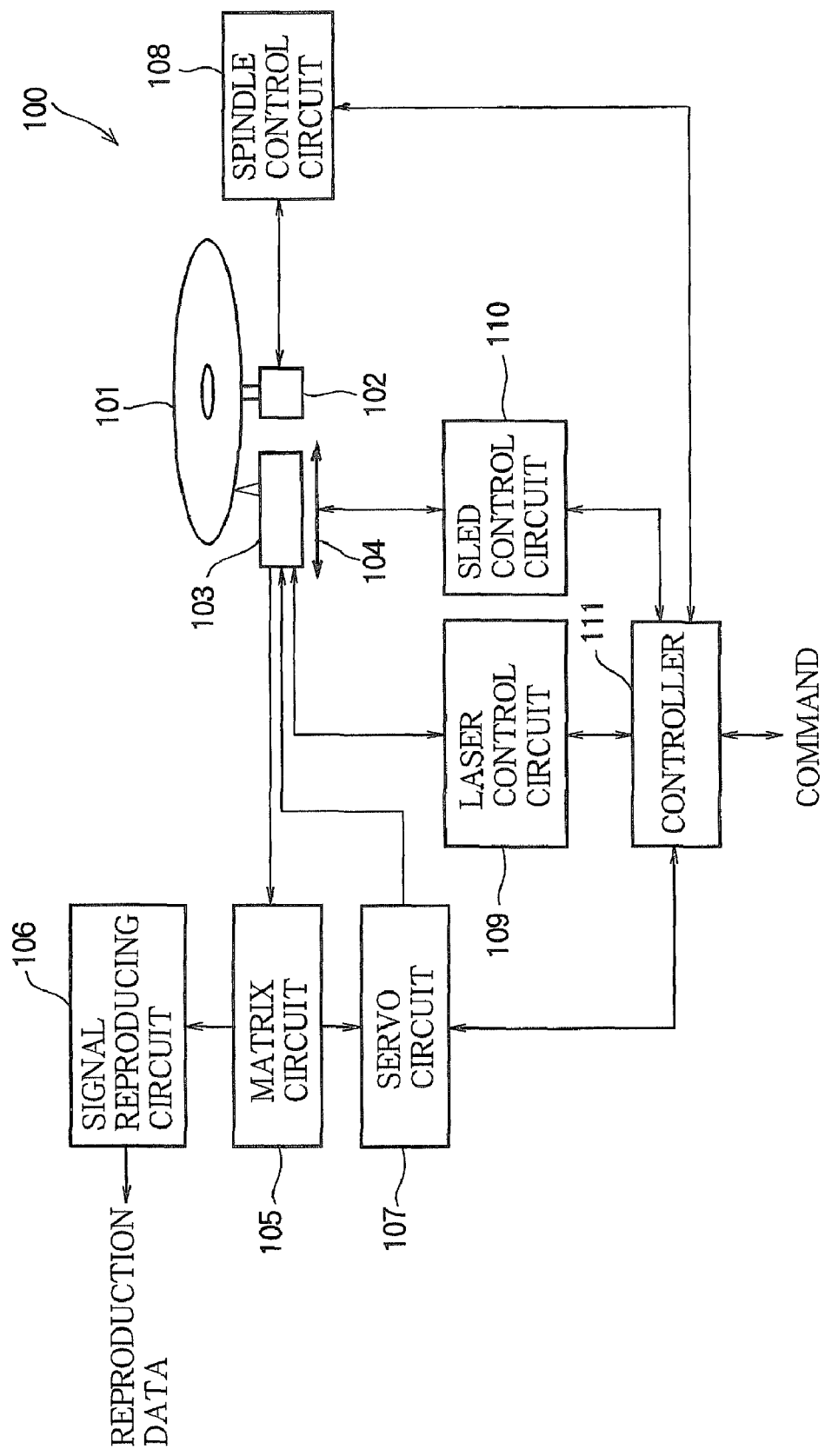

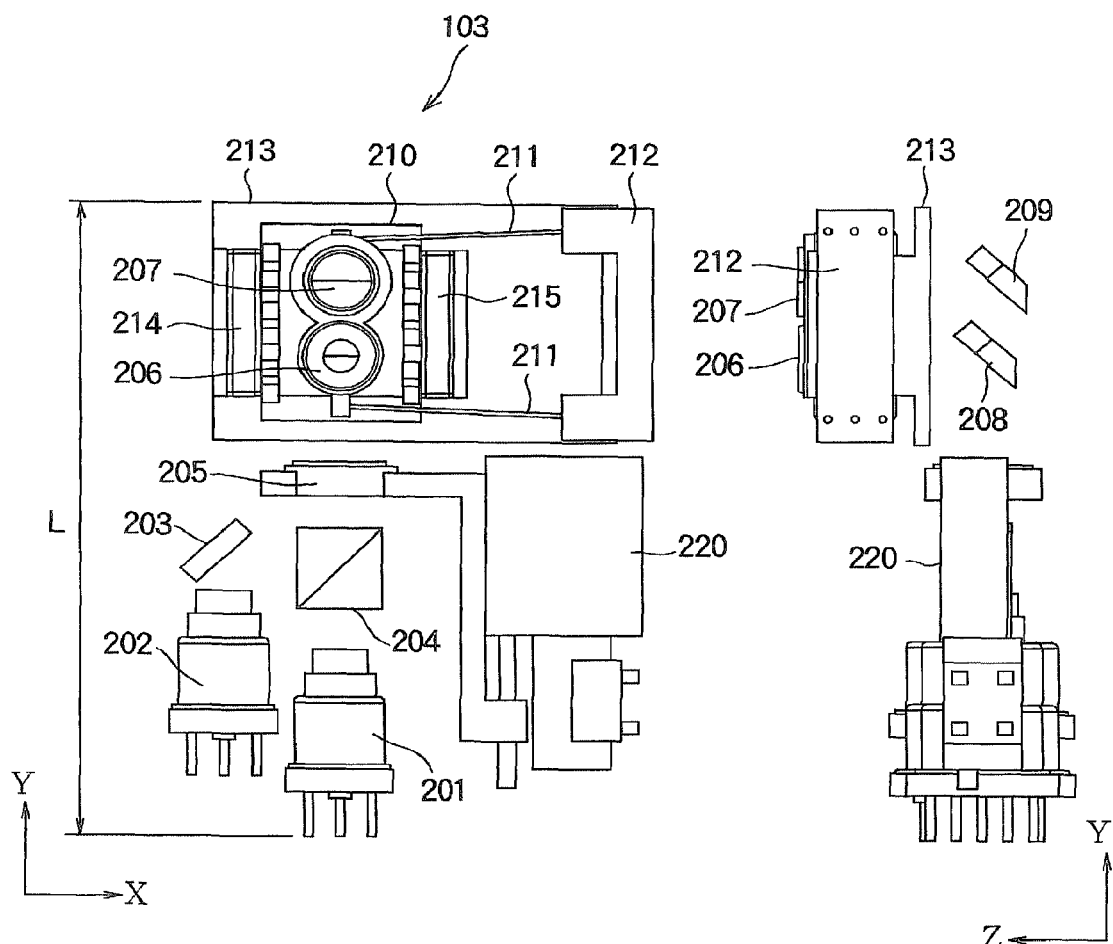

OPTICAL PICKUP DEVICE AND OPTICAL DISC DEVICE

BACKGROUND OF THE INVENTION

The present invention relates to optical pickup devices, and optical disc devices to which the optical pickup devices are mounted.

Conventionally, semiconductor lasers are widely used as light sources of optical pickup devices. However, some semiconductor lasers exhibit high astigmatism. If such a semiconductor laser is used in the optical pickup device without correcting the existing astigmatism, a diameter of a beam spot on an optical disc cannot be substantially reduced, and therefore it is difficult to enhance performance (for example, reproduction performance) of the optical pickup device. Therefore, it has been proposed to set a tilt angle of a lens provided in an optical path so as to correct the astigmatism of the semiconductor laser (see, for example, Patent Document Nos. 1 and 2).

At present, typical optical pickup devices can perform reproduction of CD (Compact Disc), DVD (Digital Versatile Disc) and BD (Blu-Ray Disc). Such an optical pickup device has a plurality of semiconductor lasers, and is configured so that laser beams emitted by respective semiconductor lasers share a common optical path, in order to achieve miniaturization of the optical pickup device.

Patent Document No. 1: Japanese Laid-open Patent Publication No. S59-58414
Patent Document No. 2: Japanese Laid-open Patent Publication No. H8-147747

However, if a tilt is given to the lens in the optical path of the optical pickup device having the plurality of semiconductor lasers, correction of astigmatism of a laser beam with low astigmatism (i.e., a laser beam which need not be corrected) is performed, as well as the correction of a laser beam with high astigmatism. For this reason, it is difficult to suitably reduce astigmatism of all of the laser beams emitted by the respective semiconductor lasers, and it is therefore difficult to enhance reproduction performance of the optical pickup device.

SUMMARY OF THE INVENTION

The present invention is intended to solve the above described problems, and an object of the present invention is to provide an optical pickup device and an optical disc device capable of suitably reducing astigmatism of laser beams emitted by a plurality of semiconductor lasers.

According to an aspect of the present invention, there is provided an optical pickup device including a plurality of laser light sources emitting laser beams of different oscillation wavelengths, and a plurality of objective lenses on which the laser beams in the form of diverging beams emitted by the plurality of laser light sources are incident. The plurality of objective lenses directly focus the laser beams onto a recording surface of an optical disc. The optical pickup device further includes a rising mirror that reflects a laser beam in the form of a diverging beam emitted by a laser light source of a predetermined oscillation wavelength among the plurality of laser light sources so as to lead the laser beam to one of the plurality of objective lenses, and transmits the laser beam in the form of a diverging beam emitted by the other laser light source. As the rising mirror transmits the laser beam in the form of the diverging beam emitted by said other laser light source, astigmatism is generated so as to correct existing astigmatism of the laser beam emitted by said other laser light source.

With such a configuration, correction of astigmatism of the laser beam with relatively low astigmatism emitted by the laser light source of a predetermined oscillation wavelength (for example, a shortest oscillation wavelength) is not performed. In contrast, correction of astigmatism of the laser beam with relatively high astigmatism emitted by the other laser light source is performed as the laser beam passes through the rising mirror. Therefore, astigmatism of the laser beams emitted by the respective laser light sources can be suitably reduced, and performance of the optical pickup device can be enhanced.

Further scope of applicability of the present invention will become apparent from the detailed description given hereinafter. However, it should be understood that the detailed description and specific embodiments, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the attached drawings:

FIG. 1 shows a schematic view showing a configuration of an optical pickup device according to Embodiment 1;

FIGS. 3A, 3B and 3C are respectively a plan view, a side view and a rear view showing a configuration example of the optical pickup device according to Embodiment 1;

DETAILED DESCRIPTION OF THE PREFERRED EMBODIMENT

Embodiment 1

Figure 2A:
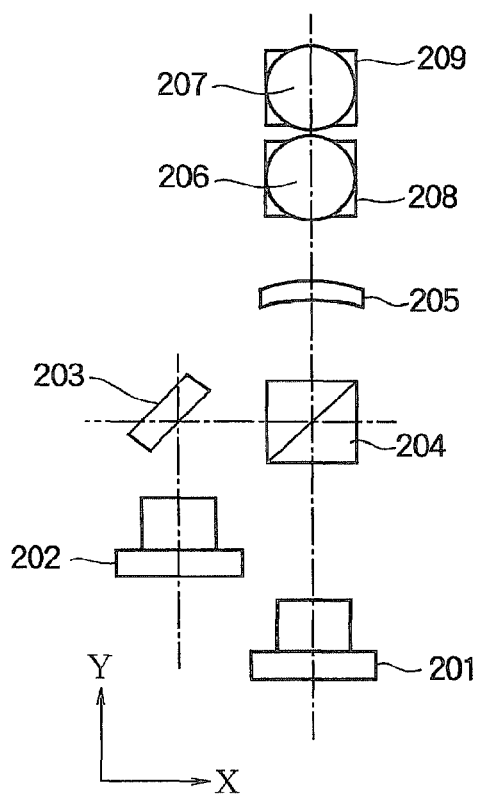
FIG. 2A is a plan view showing an optical system of the optical pickup device according to Embodiment 1.

FIG. 1 is a schematic view showing a configuration of an optical disc device 100 according to Embodiment 1 of the present invention. The optical disc device 100 will be herein described as being configured to reproduce data recorded in an optical disc (i.e., media). However, the optical disc device 100 can also be configured to perform recording and reproducing, or to perform only recording.

As shown in FIG. 1, the optical disc device 100 of Embodiment 1 includes a turntable (not shown) to which an optical disc 101 is mounted, a spindle motor 102 as a disc driving unit for rotating the turntable, an optical pickup device 103 for reading data recorded in the optical disc 101, and a moving unit 104 for moving the optical pickup device 103 in a radial direction of the optical disc 101.

The optical disc device 100 further includes a matrix circuit 105 supplied with electric signals corresponding to amounts of laser beams detected by respective light-receiving surfaces (i.e., light-receiving elements) of integrated optical units 201 and 202 of the optical pickup device 103. The optical disc device 100 further includes a signal reproducing circuit 106, a servo circuit 107, a spindle control circuit 108, a laser control circuit 109, a sled control circuit 110, and a controller 111.

The matrix circuit 105 includes a matrix calculation circuit, an amplifier circuit and the like. The optical pickup device 103 performs matrix calculation on output signals from respective light-receiving elements of the integrated optical units 201 and 202 of the optical pickup device 103, and produces necessary signals, for example, a high-frequency reproduction signal, a focusing-error signal and a tracking-error signal for servo control. The reproduction signal outputted from the matrix circuit 105 is supplied to the signal reproducing circuit 106. The focusing-error signal and the tracking-error signal are supplied to the servo circuit 107.

The signal reproducing circuit 106 performs binarization of the reproduction signal outputted from the matrix circuit 105, and performs reproduction clock generating processing and the like to produce reproduction data. The reproduction data (i.e., decoded data) is transferred to a host device (not shown) such as an AV system device or a personal computer.

The servo circuit 107 produces a focusing-servo driving signal and a tracking-servo driving signal based on the focusing-error signal and the tracking-error signal outputted from the matrix circuit 105, and causes the optical pickup device 103 to perform a servo operation. That is, the servo circuit 107 drives focusing coils and tracking coils of an objective lens actuator of the optical pickup device 103. A focusing-servo loop and a tracking-servo loop are formed by the optical pickup device 103, the matrix circuit 105 and the servo circuit 107.

The spindle control circuit 108 controls a rotation of the spindle motor 102. The laser control circuit 109 controls intensity of a laser beam emitted by the optical pickup device 103. The sled control circuit 110 drives the moving unit 104 to move the optical pickup device 103 in the radial direction of the optical disc 101 so that the optical pickup 103 can read data recorded in a desired position in the radial direction of the optical pickup 103.

The above described servo control operation and reproduction control operation are performed under control of the controller 111 constituted by a micro computer. The controller 111 performs various processing in accordance with commands from the host device.

Figure 2B:
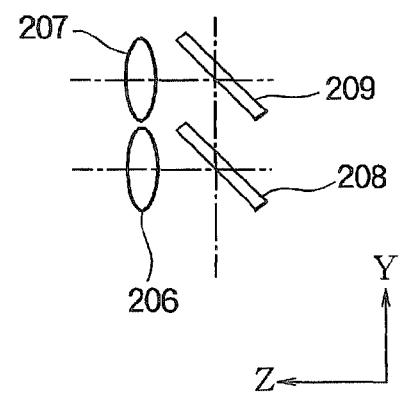
FIG. 2B is a side view showing a part of the optical system of the optical pickup device according to Embodiment 1.

FIG. 2A is a plan view showing an optical system of the optical pickup device 103 according to Embodiment 1. FIG. 2B is a side view showing a part of the optical system of the optical pickup device 103. As shown in FIG. 2A, the optical pickup device 103 includes an integrated optical unit 201 for BD, an integrated optical unit 202 for DVD/CD, a reflection mirror 203, a dichroic prism 204, a coupling lens 205, a BD finite-type objective lens 206, a DVD/CD finite-type objective lens 207, a dichroic mirror 208 and a reflection mirror 209.

The integrated optical unit 201 (as a laser light source) includes a BD semiconductor laser integrated with a light-receiving element. Oscillation wavelength of the BD semiconductor laser is approximately 405 nm. The integrated optical unit 202 (as a laser light source) includes a DVD/CD dual-wavelength semiconductor laser integrated with a light-receiving element. Oscillation wavelength of the DVD/CD dual-wavelength semiconductor laser is switchable between approximately 660 nm and approximately 785 nm in accordance with an applied voltage.

The reflection mirror 203 is a total reflection mirror, and reflects a laser beam emitted by the DVD/CD semiconductor laser of the integrated optical unit 202.

The dichroic prism 204 transmits the laser beam emitted by the BD semiconductor laser of the integrated optical unit 201, and reflects the laser beam emitted by the DVD/CD semiconductor laser of the integrated optical unit 202 (and reflected by the reflection mirror 203). The laser beams emitted by the integrated optical units 201 and 202 proceed along a common optical path from the dichroic prism 204 to the dichroic mirror 208.

The dichroic mirror 208 (as a rising mirror) receives the laser beams having passed through the dichroic prism 204 and the coupling lens 205. The dichroic mirror 208 reflects the laser beam (in the form of a diverging beam) with the wavelength of approximately 405 nm (emitted by the BD semiconductor laser of the integrated optical unit 201) toward the BD finite-type objective lens 206, and transmits the laser beams (in the form of diverging beams) with the wavelengths of approximately 660 nm and approximately 785 nm emitted by DVD/CD semiconductor laser of the integrated optical unit 202.

The reflection mirror 209 reflects the laser beams (in the form of diverging beams) with the wavelengths of approximately 660 nm and approximately 785 nm (having passed through the dichroic mirror 208) toward the DVD/CD finite-type objective lens 207.

The BD finite-type objective lens 206 receives the laser beam (in the form of a diverging beam) reflected by the dichroic mirror 208, and directly focuses the incident laser beam onto a recording surface of the optical disc 101 (FIG. 1). The DVD/CD finite-type objective lens 207 receives the laser beam (in the form of a diverging beam) reflected by the dichroic mirror reflected by the reflection mirror 209, and directly focuses the incident laser beam onto the recording surface of the optical disc 101.

FIGS. 3A, 3B and 3C are respectively a plan view, a side view and a rear view showing a configuration example of the optical pickup device 103. As shown in FIGS. 3A through 3C, the BD finite-type objective lens 206 and the DVD/CD finite-type objective lens 207 are arranged in the radial direction of the optical disc 1 (i.e., Y-direction) in such a manner that respective optical axes are oriented in a direction (i.e., Z-direction) perpendicular to the recording surface of the optical disc 101. The BD finite-type objective lens 206 and the DVD/CD finite-type objective lens 207 are mounted to, for example, a lens holder 210 of a substantially rectangular parallelepiped shape.

Hereinafter, a direction of the optical axes of the BD finite-type objective lens 206 and the DVD/CD finite-type objective lens 207 (i.e., the direction perpendicular to the recording surface of the optical disc 101) will be referred to as Z-direction. The radial direction of the optical disc 101 will be referred to as Y-direction. A direction perpendicular to both of the Y-direction and the Z-direction will be referred to as X-direction.

Wires 211 are fixed to both end surfaces of the lens holder 210 in the Y-direction. For example, three wires 211 are fixed to each end surface of the lens holder 210. Terminal ends of respective wires 211 are fixed to a wire holding portion 212 provided on a base 213 of the optical pickup device 103. The wires 211 and the wire holding portion 212 constitute a resilient supporting unit that supports the objective lenses 206 and 207 so as to be movable in the Y-direction and the Z-direction.

Focusing coils and tracking coils (not shown) are fixed to both end surfaces of the lens holder 210 in the X-direction so that the focusing coils and the tracking coils face magnets 214 and 215 provided on the base 213. The magnets 214 and 215, the focusing coils and the tracking coils constitute a driving unit that moves the objective lenses 206 and 207 in the Y-direction and the Z-direction. The driving unit and the above described resilient supporting unit constitute the objective lens actuator.

The objective lenses 206 and 207 are arranged in the Y-direction, and the integrated optical units 201 and 202 are arranged in the Y-direction. With such an arrangement, a width W of the optical pickup device 103 in the X-direction can be shorten, while a length L of the optical pickup device 103 in the Y-direction is relatively long. The reduction in the width W of the optical pickup device 103 provides an advantage in the case where the optical pickup device 103 is mounted on a floating deck.

The coupling lens 205 is supported by a lens moving unit 220 so as to be movable in the X-direction. The lens moving unit 220 is configured to move the coupling lens 205 in the X-direction so as to compensate optical performance. A detailed explanation of the lens moving unit 220 will be omitted.

Figure 4A:
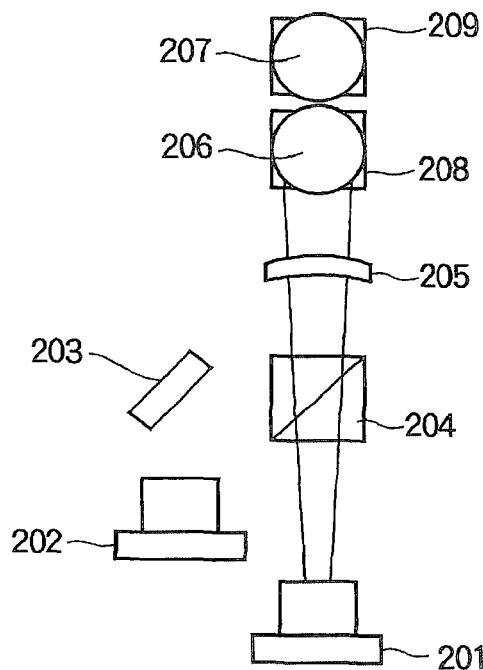
FIG. 4A is a plan view showing a BD optical path of the optical pickup device according to Embodiment 1.
Figure 4B:
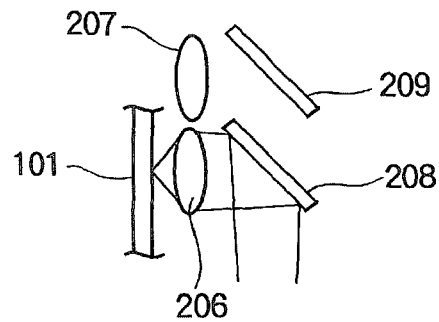
FIG. 4B is a side view showing a part of the BD optical path of the optical pickup device according to Embodiment 1.

FIG. 4A is a plan view showing a BD optical path of the optical pickup device 103. FIG. 4B is a side view showing a part of the BD optical path of the optical pickup device 103. The laser beam (in the form of a diverging beam) emitted by the BD semiconductor laser of the integrated optical unit 201 passes through the dichroic prism 204 and the coupling lens 205, is reflected by the dichroic mirror 208, and is incident on the BD finite-type objective lens 206. The BD finite-type objective lens 206 directly focuses the incident laser beam onto the recording surface of the optical disc 101. The laser beam reflected by the recording surface of the optical disc 101 passes through the BD finite-type objective lens 206, is reflected by the dichroic mirror 208, passes through the coupling lens 205 and the dichroic prism 204, and is incident on the light-receiving element of the integrated optical unit 201.

Figure 5A:
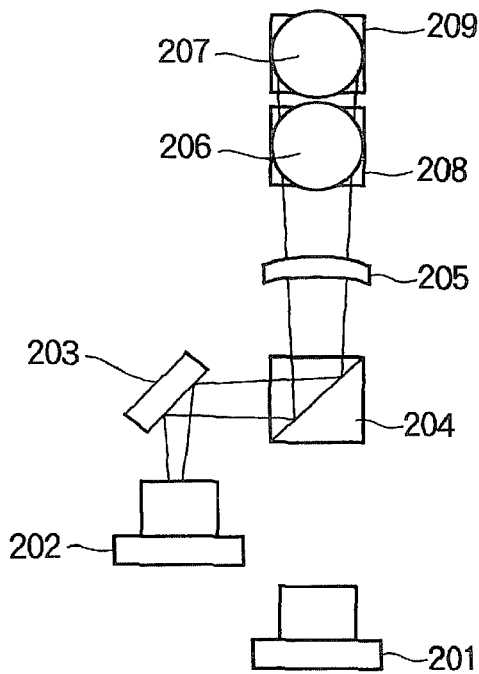
FIG. 5A is a plan view showing a DVD/CD optical path of the optical pickup device according to Embodiment 1.
Figure 5B:
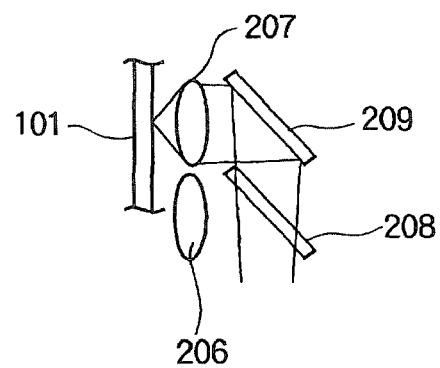
FIG. 5B is a side view showing a part of the DVD/CD optical path of the optical pickup device according to Embodiment 1.

FIG. 5A is a plan view showing a DVD/CD optical path of the optical pickup device 103. FIG. 5B is a side view showing a part of the DVD/CD optical path of the optical pickup device 103. The laser beam (in the form of a diverging beam) emitted by the DVD/CD semiconductor laser of the integrated optical unit 202 is reflected by the reflection mirror 203 and the dichroic prism 204, passes through the coupling lens 205 and the dichroic mirror 208, is reflected by the reflection mirror 209, and is incident on the DVD/CD finite-type objective lens 207. The DVD/CD finite-type objective lens 207 directly focuses the incident laser beam onto the recording surface of the optical disc 101. The laser beam reflected by the recording surface of the optical disc 101 passes through the DVD/CD finite-type objective lens 207, is reflected by the reflection mirror 209, passes through the dichroic mirror 208 and the coupling lens 205, is reflected by the dichroic prism 204 and the reflection mirror 203, and is incident on the light-receiving element of the integrated optical unit 202.

In general, the BD semiconductor laser has no astigmatism, but the DVD/CD semiconductor laser has astigmatism. In this Embodiment 1, among the BD semiconductor laser of the integrated optical unit 201 and the DVD/CD semiconductor laser of the integrated optical element 202, astigmatism of the DVD/CD semiconductor laser is corrected as described below.

Figure 6:
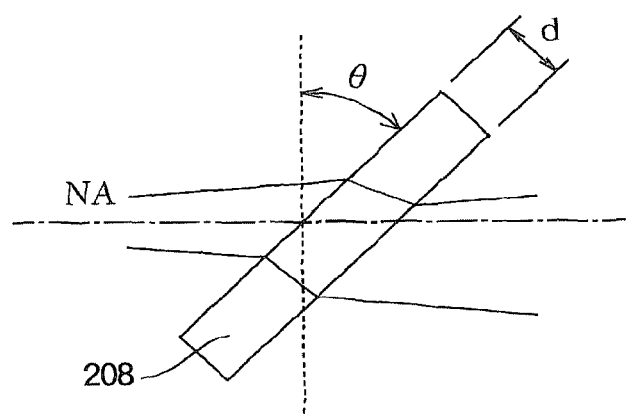
FIG. 6 is a schematic view showing a dichroic mirror and the DVD/CD optical path according to Embodiment 1.

FIG. 6 is a schematic view showing the dichroic mirror 208 and the DVD/CD optical path. The dichroic mirror 208 is a plane mirror having a constant thickness d, and has a refractive index n. The dichroic mirror 208 is inclined at an angle θ with respect to a plane perpendicular to an incident optical axis of the dichroic mirror 208. Astigmatism given to the laser beam (of numerical aperture NA) having passed through the dichroic mirror 208 and is expressed as the following equation (1):

$$AS = \frac{1}{\lambda} \cdot \frac{d}{2} \cdot \frac{(n^2-1)\sin^2\theta}{(n^2-\sin^2\theta)^{\frac{3}{2}}}(NA)^2[\lambda] \qquad (1)$$

The DVD/CD semiconductor laser of the integrated optical units 202 has astigmatism as described above. Such astigmatism makes it difficult to sufficiently reduce a diameter of a beam spot on the optical disc 101, so that it becomes difficult to enhance reproduction performance of the optical pickup device 103. Therefore, in Embodiment 1, the dichroic mirror 208 generates astigmatism whose polarity is opposite to that of existing astigmatism of the DVD/CD semiconductor laser so as to correct and reduce the existing astigmatism of the DVD/CD semiconductor laser.

Figure 7:
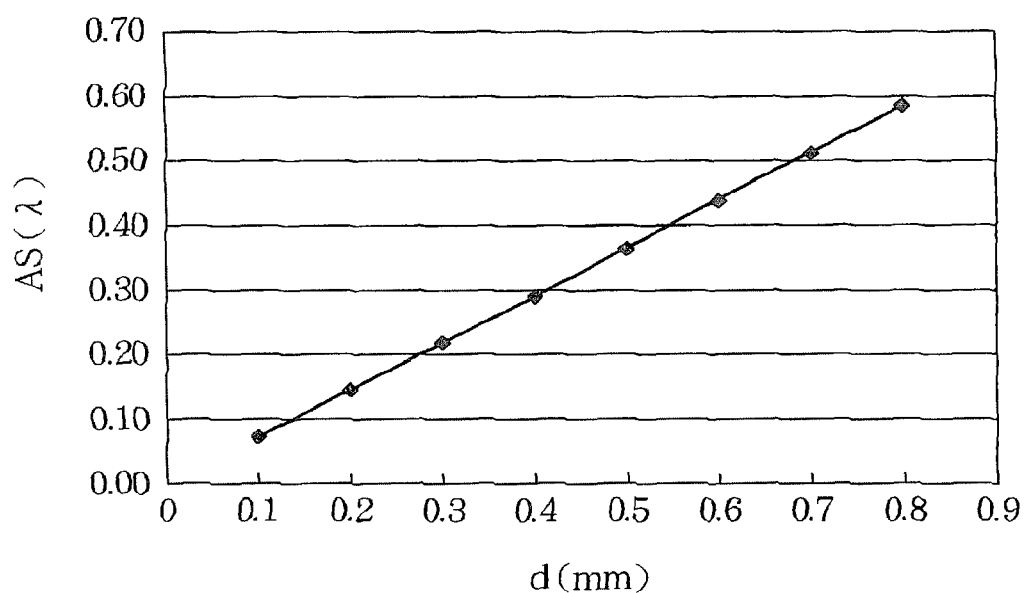
FIG. 7 is a graph showing a relationship between a thickness of the dichroic mirror and astigmatism generated by the dichroic mirror according to Embodiment 1.

FIG. 7 is a graph showing a relationship between the thickness d of the dichroic mirror 208 and the astigmatism AS generated by the dichroic mirror 208. The wavelength λ of the laser beam is 660 nm (i.e., for DVD). The inclination angle 8 of the dichroic mirror 208 is 45°. Further, the refractive index n of the dichroic mirror 208 is 1.52, and the numerical aperture NA is 0.065. If the existing astigmatism of the laser beam emitted by the DVD semiconductor laser is −0.15λ (0.030 λrms), the thickness d of the dichroic mirror 208 is set to 0.2 mm to generate the opposite astigmatism of +0.15λ so as to correct and reduce the existing astigmatism of the laser beam with the wavelength of 660 nm.

In contrast, the BD semiconductor laser of the integrated optical unit 201 has no astigmatism. The laser beam emitted by the BD semiconductor is reflected by the dichroic mirror 208. Since the laser beam (emitted by the BD semiconductor) does not pass through the dichroic mirror 208, the laser beam is not given astigmatism.

In this regard, an optimum thickness d of the dichroic mirror 208 for the laser beam with the wavelength λ of 785 nm (i.e., for CD) is substantially the same as that for the laser beam with the wavelength λ of 660 nm (i.e., for DVD), but a slight difference may exist therebetween. In this example, the thickness d of the dichroic mirror 208 is set to 0.2 mm while giving priority to the correction of the astigmatism of the laser beam with the wavelength λ of 660 nm (i.e., for DVD). This is because the correction of astigmatism of the laser beam with the wavelength λ of 660 nm (i.e., for DVD) need be more accurately performed.

According to Embodiment 1, the laser beam (having astigmatism) emitted by the DVD/CD semiconductor laser passes through the dichroic mirror 208, and the astigmatism of the laser beam is corrected. In contrast, the laser beam (having no astigmatism) emitted by the BD semiconductor laser is reflected by the dichroic mirror 208, and the correction of astigmatism of the laser beam is not performed. Therefore, each of the laser beams emitted by the BD integrated optical elements 201 and 202 can form a small beam spot on the optical disc 101. Thus, reproduction performance of the optical pickup device 103 can be enhanced.

As described above, according to Embodiment 1 of the present invention, the correction of astigmatism of the laser beam whose astigmatism need be corrected is performed. In contrast, the correction of astigmatism of the laser beam whose astigmatism need not be corrected (in this example, the laser beam emitted by the laser light source of the shortest oscillation wavelength) is not performed. Therefore, astigmatism of the respective laser beams can be suitably reduced. Thus, influence of astigmatism can be suppressed, and reproduction performance of the optical pickup device 103 can be enhanced.

Further, the correction of astigmatism is performed by means of the dichroic mirror 208 as the rising mirror, and therefore it is not necessary to provide an optical element exclusive for correcting astigmatism. Therefore, astigmatism of the laser beams can be reduced without increasing the number of optical elements.

Embodiment 2

Figure 8A:
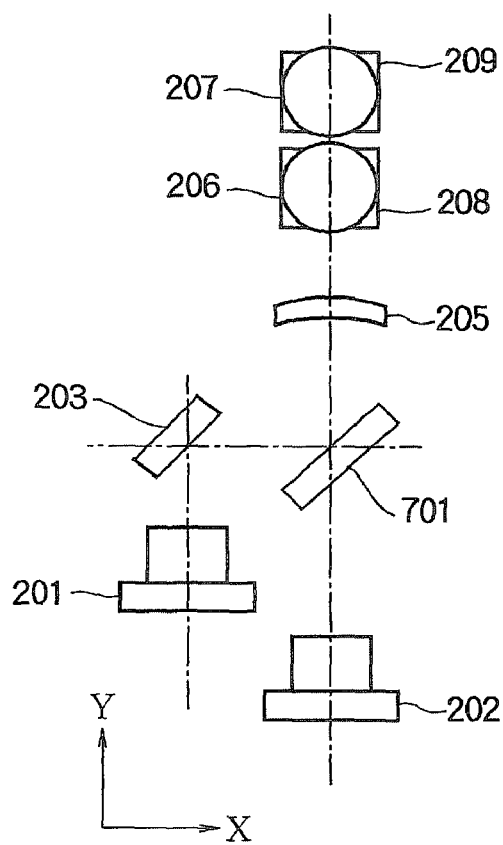
FIG. 8A is a plan view showing an optical system of an optical pickup device according to Embodiment 2.
Figure 8B:
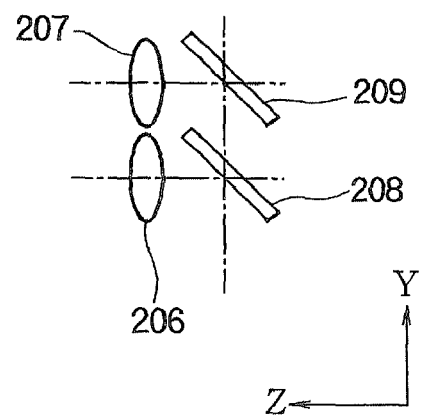
FIG. 8B is a side view showing a part of the optical system of the optical pickup device according to Embodiment 2.

FIG. 8A is a plan view showing an optical system of an optical pickup device 103 according to Embodiment of the present invention. FIG. 8B is a side view showing a part of the optical system of the optical pickup device 103. Elements which are the same as those of the optical pickup device 103 of Embodiment 1 (FIGS. 2 to 6) are assigned the same reference numerals. The optical pickup device 103 of Embodiment 2 has a dichroic mirror 701 (as a light synthesizing unit) instead of the dichroic prism 204 (FIG. 2) of the optical pickup device 103 of Embodiment 1.

The optical pickup device 103 includes an integrated optical unit 201 for BD, an integrated optical unit 202 for DVD/CD, a reflection mirror 203, a dichroic mirror 701, a coupling lens 205, a BD finite-type objective lens 206, a DVD/CD finite-type objective lens 207 and a reflection mirror 209.

The integrated optical unit 201 includes a BD semiconductor laser integrated with a light-receiving element. The integrated optical unit 202 includes a DVD/CD dual-wavelength semiconductor laser integrated with a light-receiving element. The integrated optical units 201 and 202 of Embodiment 2 respectively have the same configurations as those of Embodiment 1, but are arranged in reversed positions with respect to those of Embodiment 1.

The dichroic mirror 701 reflects a laser beam (in the form of a diverging beam) emitted by the BD semiconductor laser of the integrated optical unit 201, and transmits a laser beam (in the form of a diverging beam) emitted by the DVD/CD semiconductor laser of the integrated optical unit 202. The laser beams (in the form of diverging beams) emitted by the integrated optical units 201 and 202 proceed along a common optical path from the dichroic mirror 701 to the dichroic mirror 208. The dichroic mirror 208 and the dichroic mirror 701 have reflection surfaces (i.e., selective transmissive/reflective surfaces) facing in directions which are at an angle of substantially 90 degrees to each other about an optical axis of the above described common optical path.

Figure 9A:
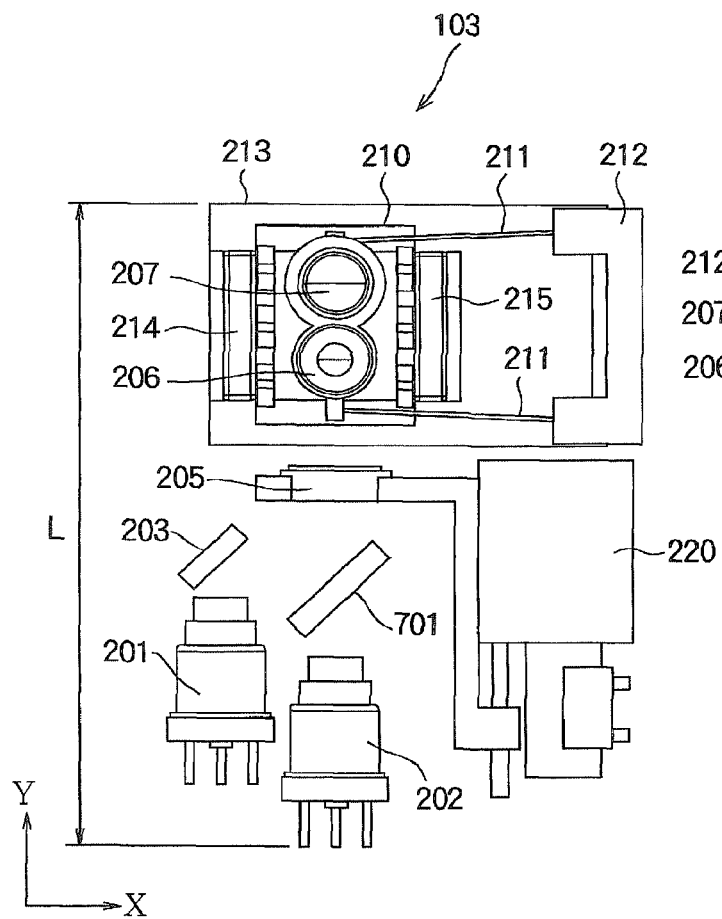
FIGS. 9A, 9B and 9C are respectively a plan view, a side view and a rear view showing a configuration example of the optical pickup device according to Embodiment 2.
Figure 9B:
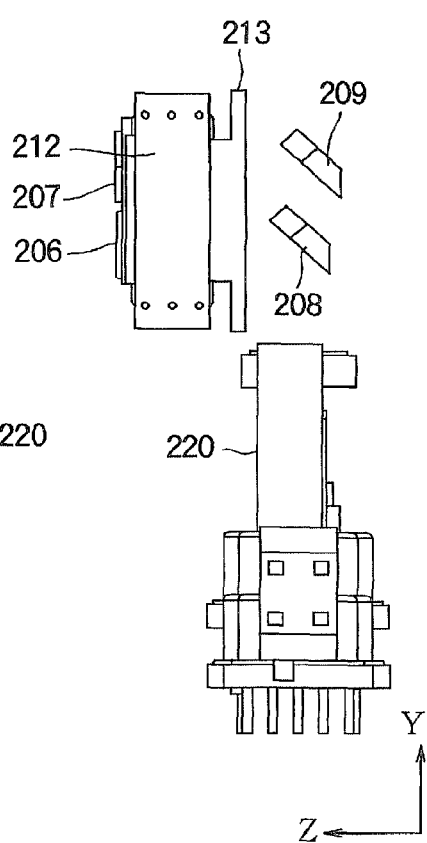
Figure 9C:
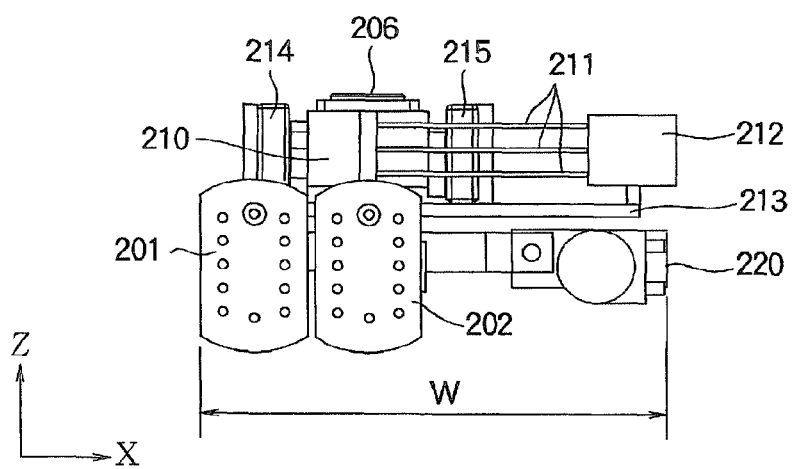

FIGS. 9A, 9B and 9C are respectively a plan view, a side view and a rear view of the optical pickup device 103. The BD finite-type objective lens 206 and the DVD/CD finite-type objective lens 207 are arranged in the radial direction of the optical disc 101 (i.e., the Y-direction) as described in Embodiment 1, so as to reduce the width W of the optical pickup device 103 in the X direction (i.e., a direction perpendicular to the radial direction of the optical disc 101).

Figure 10A:
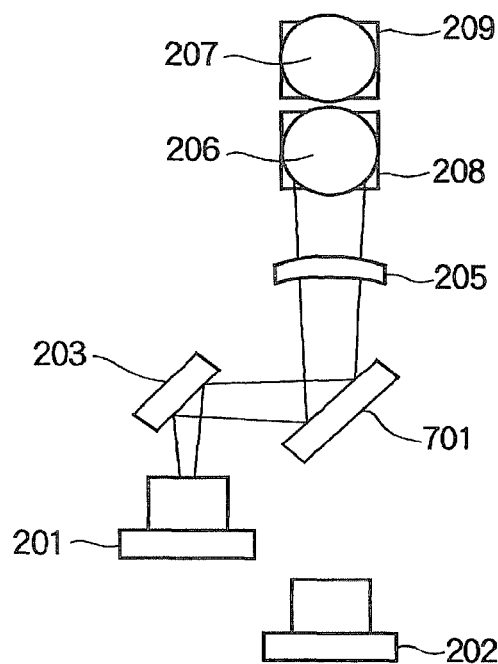
FIG. 10A is a plan view showing a BD optical path of the optical pickup device according to Embodiment 2.
Figure 10B:
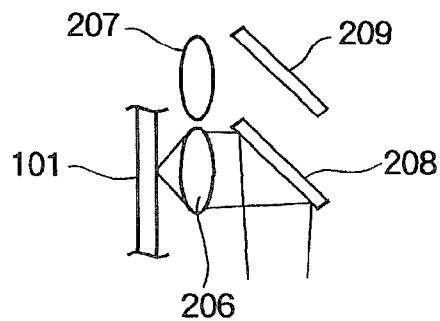
FIG. 10B is a side view showing a part of the BD optical path of the optical pickup device according to Embodiment 2.

FIG. 10A is a plan view showing a BD optical path of the optical pickup device 103. FIG. 10B is a side view showing a part of the BD optical path of the optical pickup device 103. The laser beam (in the form of a diverging beam) emitted by the BD semiconductor laser of the integrated optical unit 201 is reflected by the reflection mirror 203 and the dichroic mirror 701, passes through the coupling lens 205, is reflected by the reflection mirror 208, and is incident on the BD finite-type objective lens 206. The BD finite-type objective lens 206 directly focuses the incident laser beam onto the recording surface of the optical disc 101. The laser beam reflected by the recording surface of the optical disc 101 passes through the BD objective lens 206, is reflected by the dichroic mirror 208, passes through the coupling lens 205, is reflected by the dichroic mirror 701 and the reflection mirror 203, and is incident on the light-receiving element of the integrated optical unit 201.

Figure 11A:
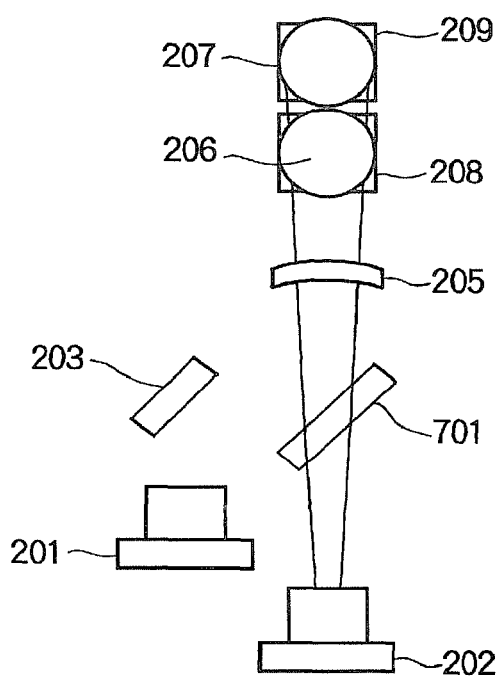
FIG. 11A is a plan view showing a DVD/CD optical path of the optical pickup device according to Embodiment 2.
Figure 11B:
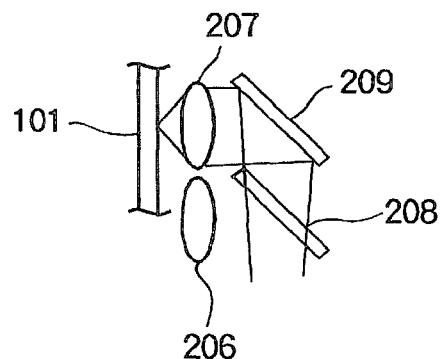
FIG. 11B is a side view showing a part of the DVD/CD optical path of the optical pickup device according to Embodiment 2.

FIG. 11A is a plan view showing a DVD/CD optical path of the optical pickup device 103. FIG. 11B is a side view showing a part of the DVD/CD optical path of the optical pickup device 103. The laser beam (in the form of a diverging beam) emitted by the DVD/CD semiconductor laser of the integrated optical unit 202 passes through the dichroic mirror 701, the coupling lens 205 and the dichroic mirror 208, is reflected by the reflection mirror 209, and is incident on the DVD/CD finite-type objective lens 207. The DVD/CD finite-type objective lens 207 directly focuses the incident laser beam onto the recording surface of the optical disc 101. The laser beam reflected by the recording surface of the optical disc 101 passes through the DVD/CD finite-type objective lens 207, is reflected by the reflection mirror 209, passes through the dichroic mirror 208, the coupling lens 205 and the dichroic mirror 701, and is incident on the light-receiving element of the integrated optical unit 202.

Figure 12:
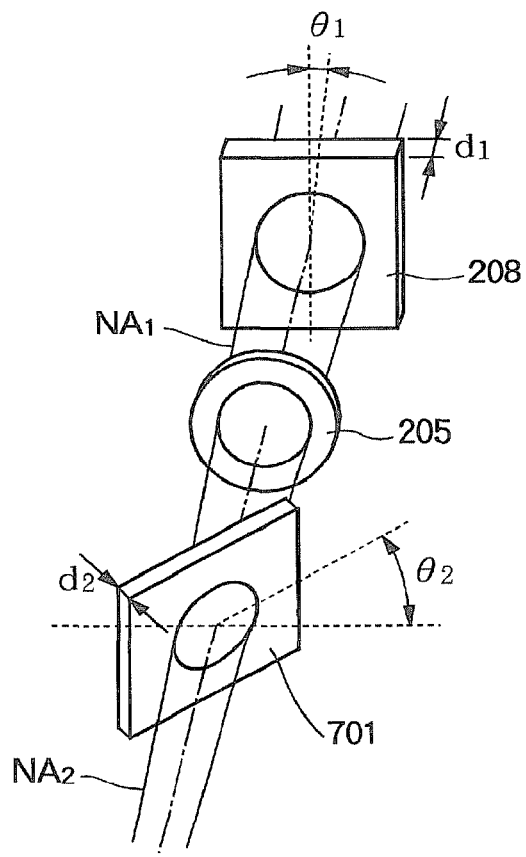
FIG. 12 is a schematic view showing a dichroic mirror and the DVD/CD optical path according to Embodiment 2.

FIG. 12 is a schematic view showing the dichroic mirrors 208 and 701 and the DVD/CD optical path. The dichroic mirror 208 is a plane mirror having a thickness $d_1$, and is inclined at an angle $\theta_1$ with respect to a plane perpendicular to an incident optical axis of the dichroic mirror 208. The dichroic mirror 701 is a plane mirror having a thickness $d_2$, and is inclined at an angle $\theta_2$ with respect to a plane perpendicular to an incident optical axis of the dichroic mirror 701. The refractive indexes of the dichroic mirrors 208 and 701 are expressed as $n_1$ and $n_2$, and numerical apertures are expressed as $NA_1$ and $NA_2$. Astigmatism "AS" given to the laser beam having passed through the dichroic mirrors 208 and 701 is expressed as the following equation (2):

$$AS = \frac{1}{\lambda}\left\{\frac{d_1}{2} \cdot \frac{(n_1^2-1)\sin^2\theta_1}{(n_1^2-\sin^2\theta_1)^{\frac{3}{2}}}(NA_1)^2 - \frac{d_2}{2} \cdot \frac{(n_2^2-1)\sin^2\theta_2}{(n_2^2-\sin^2\theta_2)^{\frac{3}{2}}}(NA_2)^2\right\}[\lambda] \quad (2)$$

The laser beam emitted by the DVD/CD semiconductor laser of the integrated optical unit 202 has astigmatism as described above. Such astigmatism makes it difficult to sufficiently reduce a diameter of a beam spot on the optical disc 101, so that it becomes difficult to enhance reproduction performance of the optical pickup device 103. Therefore, in Embodiment 2, the dichroic mirrors 701 and 208 generate astigmatism whose polarity is opposite to that of existing astigmatism of the DVD/CD semiconductor laser so as to correct the existing astigmatism of the DVD/CD semiconductor laser.

Figure 13:
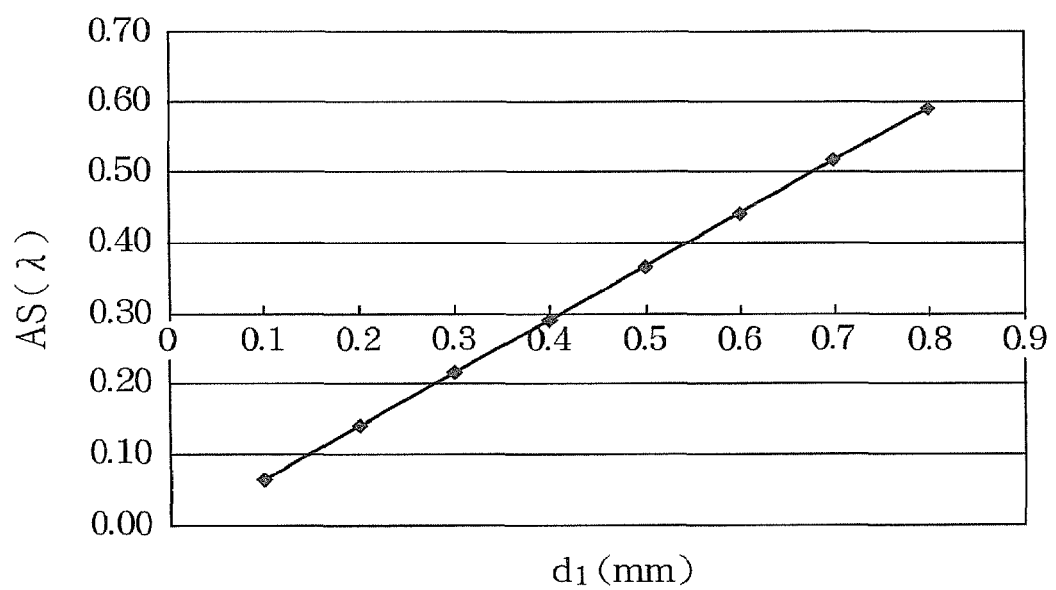
FIG. 13 is a graph showing a relationship between a thickness of the dichroic mirror and astigmatism generated by the dichroic mirror according to Embodiment 2.

FIG. 13 is a graph showing a relationship between the thickness $d_1$ of the dichroic mirror 208 and astigmatism generated by causing the laser beam to pass through the dichroic mirrors 208 and 701. The wavelength $\lambda_1$ of the laser beam is 660 nm. The inclination angle $\theta_1$ of the dichroic mirror 208 is 45°. The refractive index $n_1$ of the dichroic mirror 208 is 1.52. The numerical aperture $NA_1$ is 0.65. The inclination angle $\theta_2$ of the dichroic mirror 701 is 45°. The refractive index $n_2$ of the dichroic mirror 701 is 1.52. The numerical aperture $NA_2$ is 0.70. The thickness $d_2$ of the dichroic mirror 701 is 0.3 mm. If the existing astigmatism of the laser beam emitted by the DVD semiconductor laser is +0.15λ (0.030 λrms), the thickness $d_1$ of the dichroic mirror 208 is set to 0.2 mm to generate the opposite astigmatism of −0.15λ so as to correct and reduce the existing astigmatism of the laser beam with the wavelength of 660 nm.

In contrast, the laser beam emitted by the BD semiconductor laser of the integrated optical unit 201 has no astigmatism. The laser beam emitted by the BD semiconductor laser is reflected by the dichroic mirrors 208 and 701. Since the laser beam (emitted by the BD semiconductor laser) does not pass through the dichroic mirrors 208 and 701, the laser beam is not given astigmatism.

As described above, according to Embodiment 2 of the present invention, the correction of astigmatism of the laser beam whose astigmatism need be corrected is performed, but the correction of astigmatism of the laser beam whose astigmatism need not be corrected is not performed, as in Embodiment 1. Therefore, astigmatism of the respective laser beams can be suitably reduced. Thus, influence of astigmatism can be suppressed, and reproduction performance of the optical pickup device can be enhanced.

In the above described embodiments, the correction of astigmatism of the laser beam emitted by the semiconductor laser of the shortest oscillation wavelength is not performed, while the correction of astigmatism of the laser beam emitted by the other semiconductor laser is performed. However, the present invention is not limited to such a configuration. It is only necessary not to perform the correction of astigmatism of the laser beam whose astigmatism need not be corrected (by, for example, reflecting the laser beam by the dichroic mirror 208 in Embodiment 1), but to perform the correction of astigmatism of the laser beam whose astigmatism need be corrected (by, for example, causing the laser beam to pass through the dichroic mirror 208 in Embodiment 1).

Further, the optical pickup device of the above described embodiments has the BD semiconductor laser and the DVD/CD semiconductor laser. However, the present invention is not limited to such a configuration. The present invention is applicable to an optical pickup device having a plurality of laser light sources of different oscillation wavelengths.

Moreover, in the above described embodiments, the integrated optical unit 201 includes the BD semiconductor laser integrated with the light-receiving element, and the integrated optical unit 202 includes the DVD/CD semiconductor laser integrated with the light-receiving element. However, the present invention is not limited to such a configuration. For example, the BD semiconductor laser and the DVD/CD semiconductor laser can be provided separately from the light-receiving elements.

While the preferred embodiments of the present invention have been illustrated in detail, it should be apparent that modifications and improvements may be made to the invention without departing from the spirit and scope of the invention as described in the following claims.

What is claimed is:

1. An optical pickup device comprising:
a plurality of laser light sources emitting laser beams of different oscillation wavelengths;
a plurality of objective lenses on which the laser beams in the form of diverging beams emitted by the plurality of laser light sources are incident, the plurality of objective lenses directly focusing the respective laser beams onto a recording surface of an optical disc, and
a raising mirror that reflects a laser beam in the form of a diverging beam emitted by a laser light source of a predetermined oscillation wavelength among the plurality of laser light sources so as to lead the laser beam to one of the plurality of objective lenses, and transmits a laser beam in the form of a diverging beam emitted by another laser light source,
wherein, as the raising mirror transmits the laser beam in the form of the diverging beam emitted by said another laser light source, the raising mirror gives astigmatism to the laser beam so as to correct existing astigmatism of the laser beam emitted by said another laser light source, and
wherein, as the raising mirror reflects the laser beam in the form of the diverging beam emitted by said laser light source of said predetermined oscillation wavelength, the raising mirror gives no astigmatism to the laser beam.

2. The optical pickup device according to claim 1, wherein the laser light source of the predetermined oscillation wavelength is a laser light source of a shortest oscillation wavelength among the plurality of laser light sources.

3. The optical pickup device according to claim 1, wherein the raising mirror is a plane mirror.

4. The optical pickup device according to claim 1, wherein the raising mirror is a dichroic mirror.

5. The optical pickup device according to claim 1, further comprising a light synthesizing unit selectively transmitting and reflecting the laser beams emitted by the plurality of laser light sources so as to synthesize and lead the laser beams to a common optical path,
wherein the light synthesizing unit includes a mirror that reflects the laser beam in the form of a diverging beam emitted by the laser light source of the predetermined oscillation wavelength among the plurality of laser light sources, and transmits the laser beam in the form of a diverging beam emitted by said other laser light source,
wherein, as the mirror of the light synthesizing unit transmits the laser beam in the form of the diverging beam emitted by said other laser light source, astigmatism is generated so as to correct existing astigmatism of the laser beam emitted by said other laser light source.

6. The optical pickup device according to claim 5, wherein the raising mirror and the mirror of the light synthesizing unit have reflection surfaces facing in directions which are at an angle of substantially 90 degrees to each other about an optical axis of the common optical path.

7. The optical pickup device according to claim 5, wherein the mirror of the light synthesizing unit is a plane mirror.

8. The optical pickup device according to claim 5, wherein the mirror of the light synthesizing unit is a dichroic mirror.

9. The optical pickup device according to claim 1, wherein at least one of the plurality of objective lenses is a finite-type objective lens.

10. An optical disc device including the optical pickup device according to claim 1.

* * * * *